United States Patent [19]

Wachi

[11] Patent Number: 5,471,444
[45] Date of Patent: Nov. 28, 1995

[54] SEEK CIRCUIT FOR OPTICAL DISC

[75] Inventor: Shigeaki Wachi, Tokyo, Japan

[73] Assignee: Sony Corporation, Tokyo, Japan

[21] Appl. No.: 305,804

[22] Filed: Sep. 13, 1994

Related U.S. Application Data

[63] Continuation of Ser. No. 674,329, PCT/JP90/01087, Aug. 28, 1990, abandoned.

[30] Foreign Application Priority Data

Aug. 29, 1989 [JP] Japan ................... 1-222647

[51] Int. Cl.$^6$ .................................................. G11B 7/00
[52] U.S. Cl. ..................... 369/32; 369/44.78; 360/78.14
[58] Field of Search ..................... 369/44.28, 32,
369/33, 43, 44.25, 44.27, 44.29, 50, 54,
58, 41, 44.34; 360/78.01, 78.04, 78.05,
78.06, 73.01, 73.03, 78.14, 78.12, 73.04,
78.09; 358/907

[56] References Cited

U.S. PATENT DOCUMENTS

| | | | |
|---|---|---|---|
| 3,731,177 | 5/1973 | Commander et al. | 360/78.06 X |
| 4,547,822 | 10/1985 | Brown | 360/78.06 |
| 4,622,604 | 11/1986 | Hashimoto et al. | 360/78.07 |
| 4,636,883 | 6/1987 | Hashimoto | 360/78.07 |
| 4,800,549 | 1/1989 | Yamagami et al. | 364/56 |
| 4,835,752 | 5/1989 | Nakatsu et al. | 369/32 |
| 4,858,041 | 8/1989 | Brown | 360/78.09 |
| 4,926,405 | 5/1990 | Hangai et al. | 360/78.06 X |
| 4,951,272 | 8/1990 | Wachi et al. | 380/78.05 |
| 5,003,524 | 3/1991 | Ikeda | 369/44.28 X |
| 5,016,126 | 5/1991 | Horie et al. | 360/78.07 |
| 5,020,044 | 5/1991 | Shimonou | 369/44.28 X |
| 5,043,961 | 8/1991 | Horie et al. | 360/78.06 X |
| 5,056,072 | 10/1991 | Wachi | 369/32 X |
| 5,063,549 | 11/1991 | Yamamuro | 369/44.28 X |
| 5,077,716 | 12/1991 | Takeda et al. | 360/78.05 X |
| 5,088,075 | 2/1992 | Yokota | 369/32 X |
| 5,126,897 | 6/1992 | Ogawa et al. | 360/78.09 |

FOREIGN PATENT DOCUMENTS

| | | |
|---|---|---|
| 277799 | 8/1988 | European Pat. Off. . |
| 289143 | 11/1988 | European Pat. Off. . |
| 338858 | 10/1989 | European Pat. Off. . |
| 0432278 | 6/1991 | European Pat. Off. . |

OTHER PUBLICATIONS

IBM "Technical Disclosure Bulletin" vol. 75 No. 9 Feb. 1983 pp. 4572–4576.
IEEE Transaction on Magnetics, vol. May–14, No. 4, Jul. 1978, pp. 182–184.
Japanese Journal of Applied Physics, vol. 26, No. 4, Sep. 16, 1987 (Natsuhara et al.).

*Primary Examiner*—Aristotelis Psitos
*Assistant Examiner*—Thang V. Tran
*Attorney, Agent, or Firm*—Jay H. Maioli

[57] ABSTRACT

In a circuit and method for moving an optical pickup to a set target track on an optical disc, namely performing a track seek operation wherein, the address of a current track is detected with address information obtained from a playback signal from the optical disc, a reference value which is generated that chronologically changes while the optical pickup is being moved from the address of the current track to the address of the target track, an actuator for moving the optical pickup in the radial direction of the optical disc being driven so as to perform the seek operation at a high speed without requiring a speed sensor for sensing the speed of the moving optical pickup.

5 Claims, 4 Drawing Sheets

SEEK CIRCUIT FOR OPTICAL DISC

This is a continuation of application Ser. No. 07/674,329 filed as PCT/JP90/01087, Aug. 28, 1990, abandoned.

TECHNICAL FIELD

The present invention relates to a seek circuit for placing an optical pickup to a target track of an optical disc.

BACKGROUND ART

Thus far, erasable optical discs such as magneto-optical discs, read after write optical discs, non-erasable ROM type optical discs, and so forth have been known. When such optical discs are used for storing digital data, it is necessary to place an optical pickup to a designated track position, namely target track as quick as possible so as to shorten the access time.

To move the optical pickup to the radial direction of the optical disc, for example, a linear motor is used. Conventionally, to shorten the seek time of the target track, the optical pickup is controlled so that it is moved at a high speed and the moving speed nearly becomes 0 at the target track, thereby enabling the tracking control to be performed immediately at the target track.

FIG. 1 shows a seek circuit proposed by the applicant of the present application in U.S. patent application Ser. No. 234,197/1988. In FIG. 1, reference numeral 2 denotes a counter. The counter 2 is cleared with a start signal SC1 sent from a control circuit 1. The counter 2 incrementally or decrementally counts (up or down) in accordance with an up-down control signal SC2. The counter 2 counts a track traverse signal Stv which is generated whenever a track is traversed by the optical pickup during a seek operation.

A count value CT of the counter 2 is sent to a D/A converter 3 and then converted into an analog signal E. The analog signal E is sent to an input terminal of the switch circuit 5. In addition, the analog signal E is sent to the other input terminal of the switch circuit 5 through an inversion circuit 4. The switch circuit 5 is switched with an output signal of the control circuit 1 in accordance with the seek direction. An output signal of the switch circuit 5 is sent to a subtraction circuit 6. An output signal of the subtraction circuit 6 is sent to an actuator 8 through a drive circuit 7. The actuator 8 is a linear motor or the like.

An optical pickup (not shown in the figure) is moved in the radial direction of an optical disc along with the actuator 8. A speed sensor 9 for detecting the moving speed of the optical pickup is provided. An output signal Sv of the speed sensor 9 is fed back to the subtraction circuit 6. In the case of the linear motor, the speed sensor is magnetically composed. In other words, the moving speed of the optical pickup is detected with a voltage induced by a change of magnetic flux of a coil moved along with the optical pickup.

In the conventional structure shown in FIG. 1, the control circuit 1 generates the up-down control signal SC2 (see FIG. 2A) for controlling the counter 2 so that the counter 2 counts up while the optical pickup is moved from the current track to TR1 which is half the value of TR2 which is the difference between the target track and the current track; and the counter 2 counts down while the optical pickup is moved from TR1 to TR2. Thus, the D/A converter 3 generates the analog signal E which goes high after the seek operation is started and the counter 2 is cleared with the start signal SC1 until TR1 and which goes low from TR1 to TR2 as shown in FIG. 2B.

In addition, the speed sensor 9 generates the output signal Sv as shown in FIG. 2C. While the actuator 8 is being moved with the output signal Sv of the speed sensor 9 from the current track to TR1, which is half the value of the target track TR2, the optical pickup is moved at a high acceleration. When the optical pickup is placed at the target track TR2, the moving speed thereof becomes 0.

There has been proposed an alternative method in which the analog output signal E from the D/A converter 3 is converted into its square root value rather than directly using the analog output signal E as the drive signal so as to smoothly decrease the speed of the actuator 8 at the target track TR2.

In the conventional seek circuit, it is necessary to provide the speed sensor 9 for obtaining the speed information of the actuator 8. However, when the linear motor is used, the speed sensor 9 is not necessary to generate the drive force. If the speed sensor can be omitted, the drive force can be further increased. In addition, besides the linear motor, when the speed sensor is provided along with the actuator, the apparatus will disadvantageously become large and require more parts.

DISCLOSURE OF INVENTION

Therefore, an object of the present invention is to provide a seek circuit which can perform a seek operation at a high speed without using a speed sensor.

According to the present invention, an address AP of a current track is detected with address information obtained from a playback signal of an optical disc. A reference value which chronologically changes from the address AP of the current track to the address AT of the target track is generated so as to drive means (33) for moving the optical pickup to the radial direction of the optical disc in accordance with the difference between the address AP of the current track and the reference value.

The reference value which chronologically changes from the address AP of the current track to the address AT of the target track is generated. The reference value can be generated by integrating the change of speed of an actuator 33 for performing the seek operation at a high speed. By using the difference between the reference value and the current address showing the position of the actuator as a drive signal, the actuator 33 is moved in accordance with the reference value.

According to the present invention, the most suitable speed change of the actuator for performing the seek operation at a high speed is set and then the speed change is integrated so as to obtain the reference value, which is a change of distance (position). Thus, since the chronological change of reference value contains speed information, it is possible to omit the speed sensor which is required in the conventional seek circuit. Therefore, the number of parts with respect to the actuator can be decreased. In addition, when the linear motor is used, with a drive coil instead of the speed sensor, the drive force can be improved.

BEST MODE FOR CARRYING OUT THE INVENTION

Figure 1:
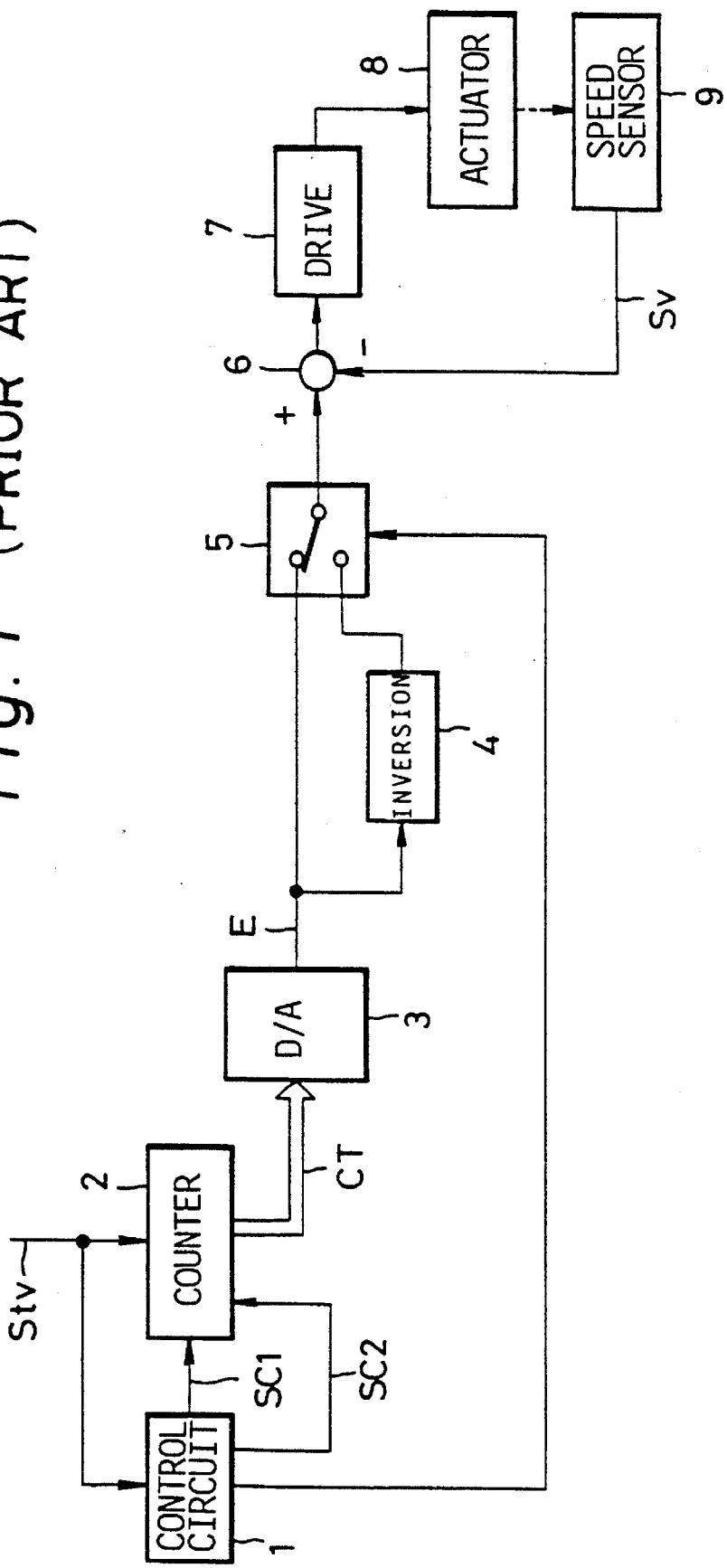
FIG. 1 is a block diagram of a conventional seek circuit for optical disc.
Figure 2A:
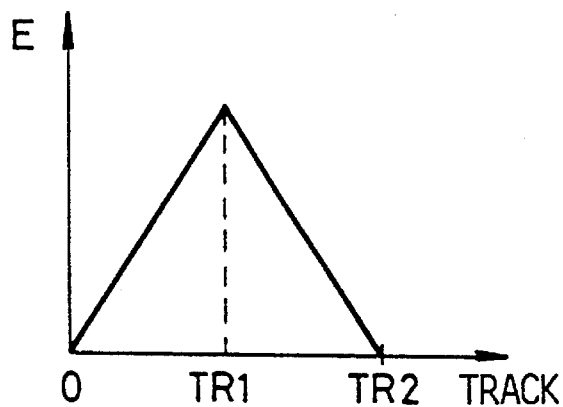
FIGS. 2A, 2B, and 2C are diagrams describing the conventional seek circuit.
Figure 2B:
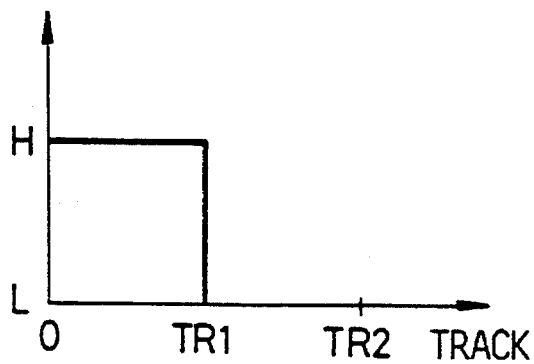
Figure 2C:
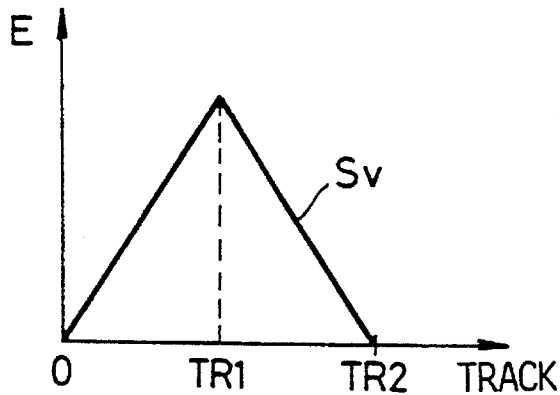
Figure 3:
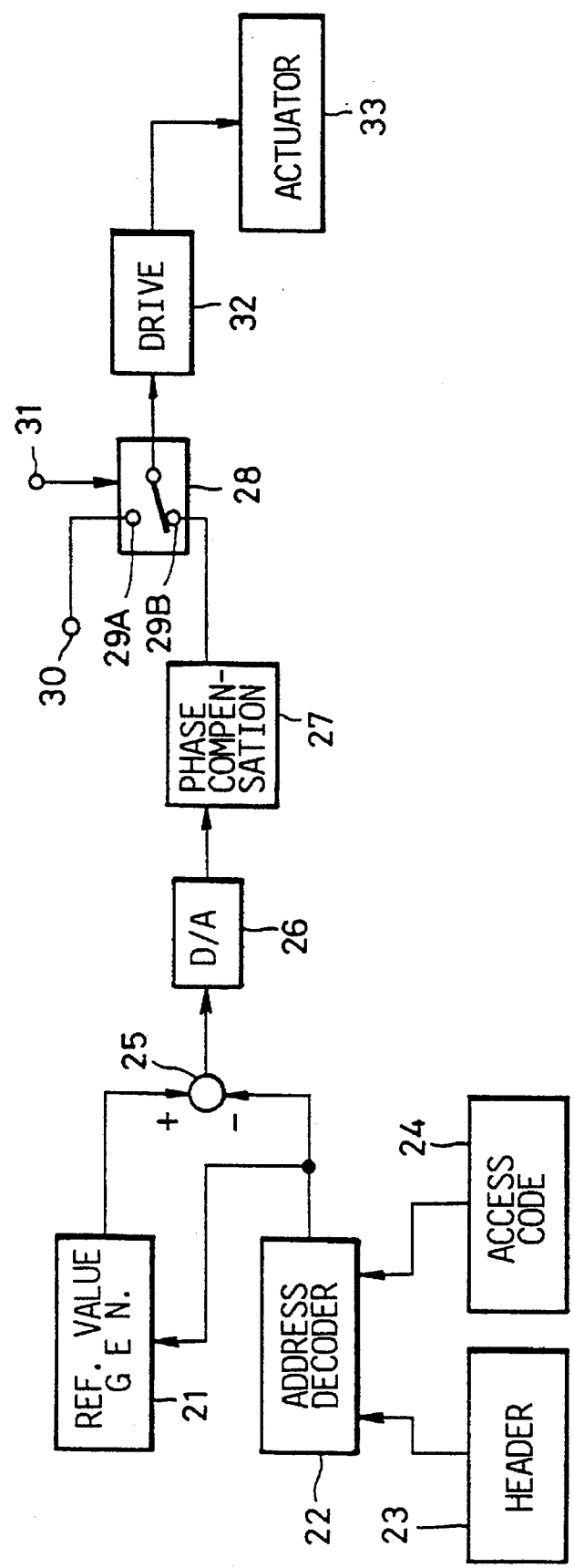
FIG. 3 is a block diagram according to an embodiment of the present invention.

With reference to the accompanying drawings, an embodiment of the present invention will be described. In FIG. 3, the reference numeral 21 denotes a reference value generation circuit composed of a microcomputer or the like; 22 denotes an address decoder; 25 indicates a subtraction circuit for detecting the difference between an output signal of the reference value generation circuit 21 and an output signal of an address decoder 22.

The current address corresponding to a track to which an optical pickup is moved in the radial direction of an optical disc, for example, a magneto-optical disc, by an actuator 33 is decoded by the address decoder 22. The current address is sent to the subtraction circuit 25. The current address at which the seek operation is started is sent to the reference value generation circuit 21. The reference value generation circuit 21 computes a time 2T within which the optical pickup is moved to a target track by means of the address at which the seek operation is started, the address of the target track, and the average speed of the actuator 33 by means of which the seek operation is being performed. With the time information, as the time elapses (0 to T to 2T), the reference value which chronologically changes (which will be described later) is generated in the reference value generation circuit 21.

An output signal of a header decoder 23 and an output signal of an access code decoder 24 are sent to the address decoder 22. In this example, a header area is provided at the beginning of each sector of the optical disc. In the header area, a sector address and a track address have been already formatted. Since the header area is provided for each sector, the address information is insufficient to seek the target track at a high speed. To compensate that, an access code has been already formatted in a servo area of each data segment which is made by dividing the sector. In addition, in the servo area, a pair of tracking pits (so-called wobble pits) which are internally and externally offset against the track center are provided. The access code is a Gray code which changes successively against a plurality of tracks, for example, 16 tracks. By using the access code and the sector address and the track address in the header, the address of the track at which the optical pickup is currently scanned is detected.

An output signal of the subtraction circuit 25 is sent to a D/A converter 26. The D/A converter 26 converts this signal into an analog signal. An output signal of the D/A converter 26 is sent to an input terminal 29B of a switch circuit 28 through a phase compensation circuit 27. On the other hand, a tracking control signal from a terminal 30 is sent to the other input terminal 29A of the switch circuit 28. The switch circuit 28 is switched with a control signal sent from a system controller (not shown in the figure) to an input terminal 31 depending on which of seek operation or tracking control operation takes place. The tracking control signal is detected with the difference of level of playback signals at the pair of tracking pits in the servo area. The tracking control signal is a signal having a level corresponding to a tracking error.

An output signal of the switch circuit 28 is sent to the actuator 33 through a drive circuit 32. The actuator is a linear motor or the like. In this embodiment, the actuator 33 moves the optical pickup in the seek operation and performs the tracking control operation for placing the center of laser beam spot to the center of the track.

Figure 4A:
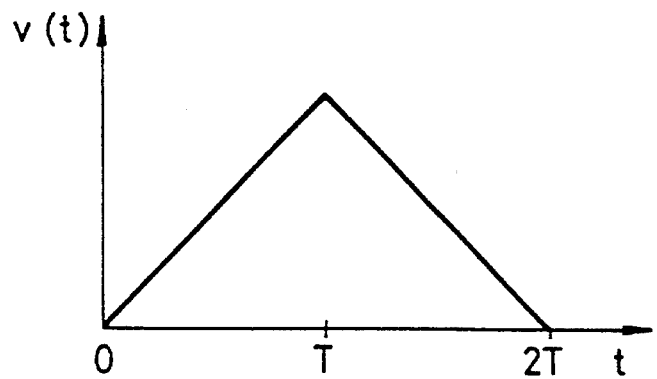
FIGS. 4A and 4B are diagrams describing an example of a reference value.
Figure 4B:
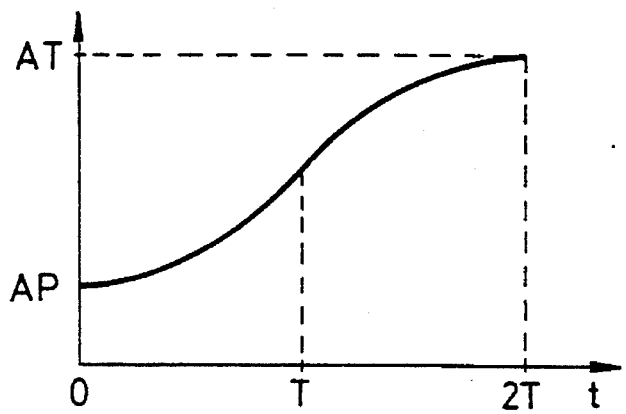

In this embodiment, the reference value generated in the reference value generation circuit 21 is set to a value chronologically changing as shown in FIG. 4B so that the speed of the actuator 33 chronologically changes as shown in FIG. 4A. In other words, the speed change (FIG. 4A) for performing the seek operation at a high speed is such that the speed v(t) of the actuator 33 increases to a time T and decreases from the time T to a time 2T where 2T is a time for which the actuator 33 is moved from the current track AP to the target track AT and T is a time which is half the value of the time 2T. Such speed change is the most suitable for the seek operation at a high speed as in the conventional seek circuit. To chronologically change the speed, the reference value x is changed from the current track AP to the target track AT as shown in FIG. 4B. The chronological change of the reference value x is obtained by means of an integration using the following equations or the like.

First, in $(0 \leq t < T)$, because $v(t)=kt$, $$x = \int_T^t v(t)dt = \frac{1}{2}kt^2 \qquad (1)$$

Then, in $(T \leq t < 2T)$, since the initial value at $(t=T)$ is $kT$, $$\int_T^t \{kT - k(t-T)\} \cdot dt = \qquad (2)$$

$$\int_T^t (2kT - kt) \cdot dt = [2kT \cdot t - \frac{1}{2}kt^2]_T^t =$$

$$2kTt - \frac{1}{2}kt^2 - 2kT^2 + \frac{1}{2}kT^2 + \frac{1}{2}kT^2 =$$

$$2kTt - \frac{1}{2}kt^2 - kt^2$$

The reference value generation circuit 21 is composed of a microcomputer for computing the above equation (1) and equation (2).

Figure 5A:
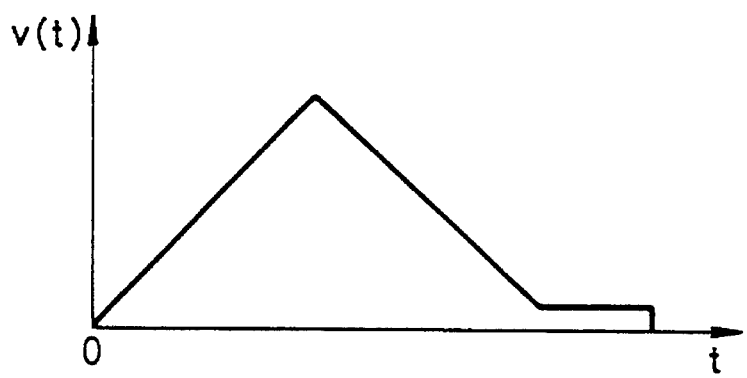
FIGS. 5A and 5B are diagrams describing another example of a reference value.
Figure 5B:
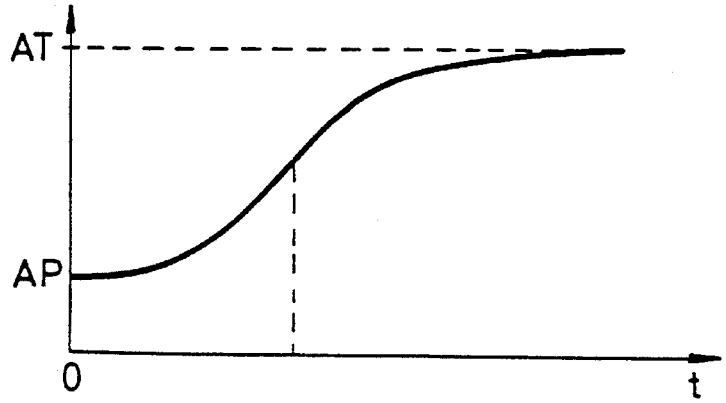

The reference value generated in the reference value generation circuit 21 may be that shown in FIG. 5B besides that shown in FIG. 4B. The chronological change of the reference value shown in FIG. 5B is used to control the actuator 33 so that its speed becomes a low constant speed at a position near the target track as shown in FIG. 5A. At a position near the target track, the actuator can be placed on a track by means of the tracking control operation.

INDUSTRIAL APPLICABILITY

Besides the magneto-optical discs, the present invention can be applied to read after write optical discs, ROM type optical discs, and so forth. In addition, the present invention can be also applied to a 2-axis type apparatus where an optical pickup moves a laser beam in the radial direction of a disc, both a linear motor and an optical pickup performing the tracking control operation.

I claim:

1. A seek circuit for moving an optical pickup to a set target track on an optical disc divided into sectors having a header area with a sector address and a track address and having an access code formed in a servo area of each sector, comprising:

a header decoder for decoding the sector address and the track address from a playback signal of said optical disc;

an access code decoder for decoding the access code from the playback signal of said optical disc;

an address decoder receiving the sector address and track address from said header decoder and said access code from said access code decoder for detecting an address of a current track;

drive means for moving said optical pickup in a radial direction of said optical disc;

reference value generating means receiving the address of said current track from said address decoder for generating a reference value which chronologically changes with time in a non-linear fashion while said optical pickup is being moved from the address of said current track to an address of said target track, said reference value generating means computing said reference value based on a predetermined average moving speed of said drive means set therein and the distance between the current track position and the target track position as determined based on the address of said current track at which a seek operation is started received from said address decoder and the address of said target track; and means for computing the difference between the address of said current track and said reference value and for controlling said drive means in accordance with said difference.

2. A seek circuit for moving an optical pickup as set forth in claim 1, wherein said drive means is a linear motor.

3. A seek method for moving an optical pickup to a set target track on an optical disc divided into sectors having a header area with a sector address and a track address and an access code in a servo area of each sector, comprising the steps of:

decoding the sector address and the track address from a playback signal of said optical disc;

decoding the access code from the playback signal of said optical disc;

detecting an address of a current track at which said optical pickup is located by using the decoded sector address, the decoded track address, and the decoded access code;

generating a reference value from the detected address of said current track at which a seek operation is started, an address of said target track, and a known, predetermined average speed of movement of the optical pickup, said reference value chronologically changing in a non-linear fashion according to the distance between the current track position and the target track position while said optical pickup is being moved from the address of said current track to the address of said target track;

calculating a difference between said reference value and the detected address of the current track; and moving said optical pickup to the radial direction of said optical disc in accordance with the calculated difference between the address of said current track and said reference value.

4. A seek method for moving an optical pickup as set forth in claim 3, wherein said step of generating a reference value includes the step of generating the reference value to have a constant level at a time 2T, wherein 2T is a time for moving the optical pickup to the target track, so that a moving speed of said optical pickup becomes constant at a position near said target track.

5. A seek method for moving an optical pickup as set forth in claim 3, wherein said step of generating a reference value includes chronologically changing the reference value, so that a moving speed of said optical pickup increases until a time T, where 2T is a time for moving said optical pickup to said target track, and so that the moving speed of said optical head decreases after the time T.

\* \* \* \* \*